United States Patent [19]
Takeuchi et al.

[11] Patent Number: 4,944,249
[45] Date of Patent: Jul. 31, 1990

[54] VACUUM-PRESSURE SUPPLY DEVICE

[75] Inventors: Toru Takeuchi; Minoru Matsuzawa, both of Suzaka, Japan

[73] Assignee: Orion Machinery Co., Ltd., Nagano, Japan

[21] Appl. No.: 218,235

[22] Filed: Jul. 12, 1988

[51] Int. Cl.⁵ .................................................. A01J 5/04
[52] U.S. Cl. ..................................... 119/14.44; 137/489
[58] Field of Search ............... 119/14.25, 14.41, 14.43, 119/14.44; 137/103, 489, 506, 526, 535

[56] References Cited

U.S. PATENT DOCUMENTS

| | | | |
|---|---|---|---|
| 2,612,182 | 9/1952 | Luster | 137/506 X |
| 2,977,966 | 4/1961 | Matthews | 137/489 X |
| 3,526,241 | 9/1970 | Veit | 137/489 X |
| 4,605,040 | 8/1986 | Meermöller | 119/14.44 X |

*Primary Examiner*—Robert P. Swiatek
*Attorney, Agent, or Firm*—McGlew & Tuttle

[57] ABSTRACT

There is disclosed a vacuum-pressure regulating device which is attached to a vacumm system in connection with a vacuum pump so that it serves to ensure a constant vacuum pressure in the vacuum system and then to supply vacuum pressure from the vacuum system, after reduced to the required extent, to a desired space. The vacuum-pressure supply device of the present invention is suitable for adjusting vacuum in vacuum systems for milking cows. The vacuum-pressure supply device consists of such a structure that there are provided two independent but adjacent sections built of casings, one of them is partitioned by a diaphragm to form a first chamber and a second chamber, the other section is partitioned also by a diaphragm to form a third and a fourth chamber, a valve secured to each diaphragm is actuated according to a pressure difference between both sides of each diaphragm thereby automatically permitting air from the vacuum system or atmospheric air to flow into or flow out from each of the aforesaid chambers, thus maintaining two vacuum systems connected to the vacuum-pressure supply device as a desired high vacuum system and a desired low-pressure system respectively.

2 Claims, 4 Drawing Sheets

VACUUM-PRESSURE SUPPLY DEVICE

BACKGROUND OF THE INVENTION

A vacuum-pressure adjuster connected to a vacuum pump or a vacuum line connected to a vacuum pump for maintaining a constant vaqcuum pressure in the vacuum line is disclosed, for instance, in Public disclosure of Japanese patent application filed by the applicant of the present application and provisionally published as No. 59-175832.

In FIG. 3, there is shown such a vacuum-pressure adjuster that a diaphragm 83 provided with a valve 82 for adjusting the flow amount of air into a vacuum system 81 is so provided in a section as to partition it into a first chamber 84 at the side of the valve 82 and a second chamber 85 opposite to the valve 82, and in this case, the first chamber 84 is in communication with atmospheric air through an opening 95 and the second chamber 85 is in communication with atmospheric air through a pilot valve 86 and opening 94 and moreover, the second chamber 85 is in communication with the vacuum system 81 through a small opening 91 of the required size.

In the drawing, numeral 87 designates a diaphragm, 94a an air-filter, 86a an air-flow inlet, 88 a spring adapted to push the diaphragm 87 downwardly and 89 a pressure-adjusting screw for the spring.

The vacuum-pressure adjuster 40 causes vacuum pressure of the vacuum system 81 to act on the fourth chamber 92 and the second chamber 85 in such a manner that the pilot valve 86 may automatically adjust the open degree of the air-flow inlet 86a due to the balance between the vacuum pressure of the fourth chamber 92 and the pressing force of the spring 88. Due to the difference between the amount of inflow of air from the air-flow inlet 86a and the amount of air flowing out from the opening 91, the degree of vacuum of the second chamber 85 can be adjusted, as the result of which pressure changes in the vacuum system 81 become pressure changes in the second chamber 85 until they are transformed to the diaphragm 83 and then the valve 82 is displaced either upwardly or downwardly, thus adjusting the amount of air flow into the vacuum system 81 and maintaining the pressure in the vacuum system 81 at a constant level.

Although this kind of vacuum-pressure adjuster acts to maintain a constant level of vacuum pressure of the whole vacuum system throughout, to which it is connected, yet, its use has heretofore been infeasible for such a purpose that it is connected to some high-vacuum system so as to maintain the pressure in it at a constant high-vacuum level, and at the same time, it is required to provide another vacuum system, as divergent from the high-vacuum system, kept at a vacuum level lower than that of the high-vacuum system.

SUMMARY OF THE INVENTION

According to the present invention, there is provided a vacuum-pressure supply device which can be used for supplying vacuum pressure generated by a vacuum pump to a second piping arrangement of a lower vacuum level or the low vacuum side, after reducing the degree of vacuum in a first vacuum piping arrangement to the required vaccum level. Particularly, this vacuum-pressure supply device can be suitably connected to a piping arrangement of high vacuum in vacuum-milking systems and another piping arrangement of low vacuum is diverged from the piping arrangement of high vacuum so that it is rendered possible to maintain a constant difference in pressure between said piping arrangement of low vacuum and high vacuum and also to maintain a constant level of vacuum in both piping arrangements.

The structure of the vacuum-pressure supply device is such that two independent but adjacent sections are partitioned by diaphragms respectively so as to form a first chamber and an adjacent second chamber, and a third chamber and an adjacent fourth chamber respectively. In this structure, the first chamber is formed with a pressure-adjusting hole in communication with a vacuum supply source represented by a vacuum pump or a vacuum piping arrangement kept under high vacuum pressure and also formed with an open portion in communication with a desired space such as a low-vacuum piping arrangement in milking systems, vacuum pressure in the desired space being adjusted to the required value, lower than that of the vacuum-pressure supply source, and there is provided a valve body having one end secured to the first diaphragm partitioning the first and second chambers and being adapted to face the pressure-adjusting hole so as to adjust the open degree of the pressure-adjusting hole due to the displacement in position of the diaphragm, and the second chamber is communicated with the vacuum-pressure supply source through a small hole and provided with an air-induction hole in communication with the third chamber. The third chamber is provided with a pilot valve adapted to face the air-induction hole due to the displacement of the second diaphragm partitioning the third and fourth chambers so that the pilot valve can adjust the amount of air flowing into the second chamber from the third chamber and moreover, the third chamber has an open portion in communication with either atmospheric air or the first chamber. The fourth chamber is in communication with the vacuum-pressure supply source and has means for supporting the diaphragm bordering the third chamber under resilient force such as spring pressure.

Due to the aforesaid structure, the present invention provides a vacuum-pressure supply device, characterized in that it is capable of maintaining the required constant vacuum pressure in the vacuum supply source and at the same time, supplying vacuum pressure, after reduced to a vacuum level lower than that of the vacuum supply source, to another desired space.

Incidentally, in the aforesaid description, indications of vacuum degree are made on the basis of atmospheric pressure standard (atmospheric pressure 0 mm Hg, absolute vacuum 760 mm Hg.) Accordingly, pressure reduction means the lowering of vacuum pressure (vacuum degree) such as the change of vacuum pressure from 450 mm Hg (high vacuum pressure) to 350 mm Hg (low vacuum pressure).

Figure 1:
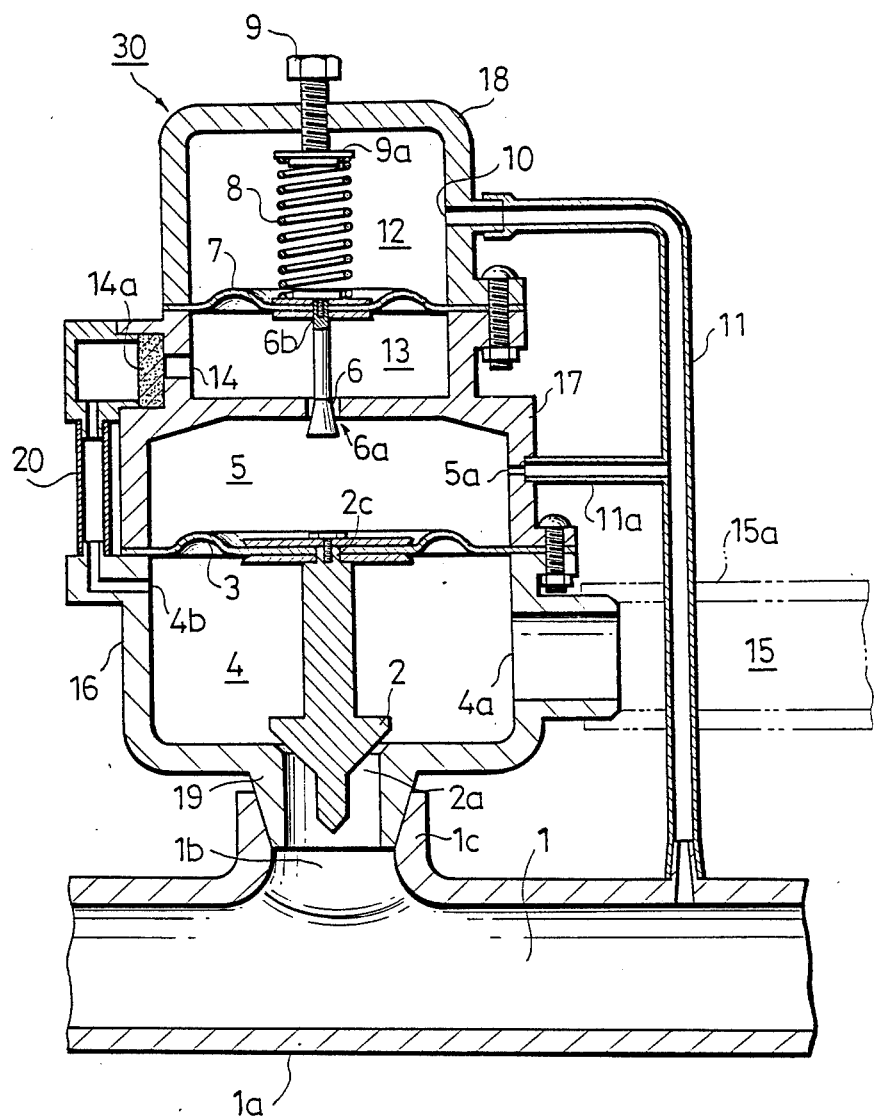
FIG. 1 is a cross section of a preferred embodiment of the present invention.
Figure 3:
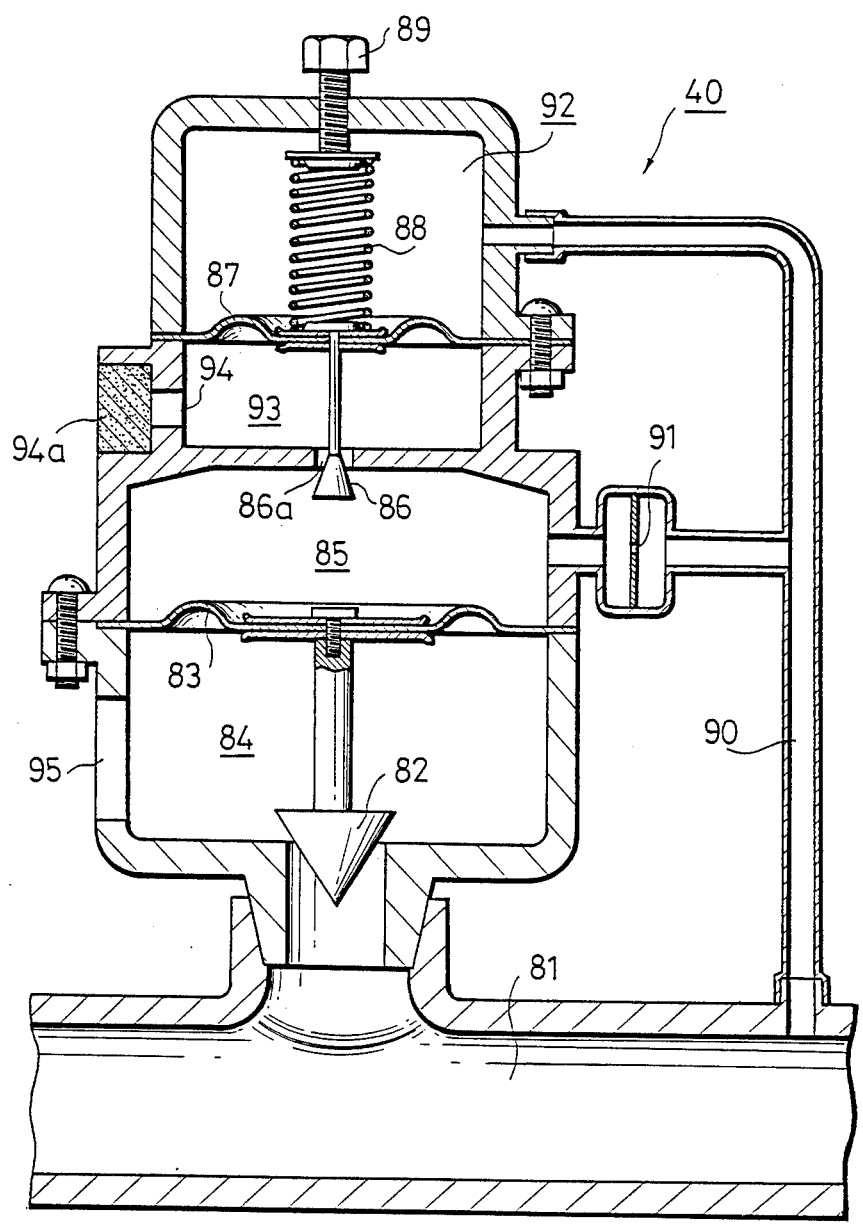
FIG. 3 is a cross section of a conventional vacuum-pressure adjuster.
Figure 4:
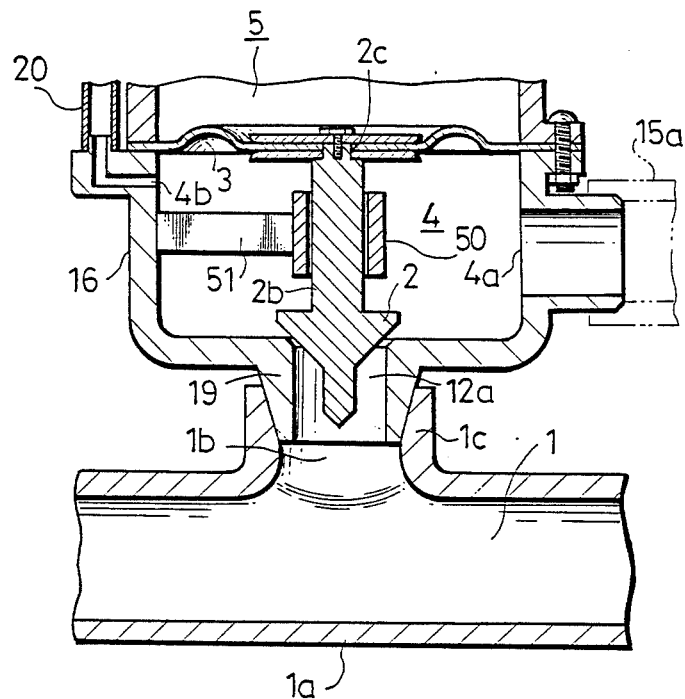
FIG. 4 is a view partly in cross section of another preferred embodiment of the present invention.

DETAILED DESCRIPTION OF THE INVENTION:

FIG. 1 shows a preferred embodiment of the present invention. Its structure is such that two independent but adjacent sections built of casings 16, 17 and 18 are partitioned by diaphragms 3 and 7 respectively so as to form a first chamber 4 and a second chamber 5 and a third chamber 13 and a foruth chamber 12 respectively. The first chamber 4 is formed with a pressure-adjusting hole 2a and an edge 19 of the first chamber 4 is projected to surround the hole 2a and said edge 19 is air-tightly inserted in the upright edge 1c of a high-vacuum pressure pipe 1a filled with high-vacuum pressure fluid (vacuum pressure generated by vacuum pump 63) while having one end of the high-vacuum pipe 1a connected to a vacuum pump (indicated at 63 in FIG. 3).

The base 2c of a valve body 2 hanging down in the pressure-adjusting hole 2a is secured to the proximity of center of the diaphragm 3. The valve body 2 can perfectly close the pressure-adjusting hole 2a or stand still in such a position as there occurs a balance between vacum pressures of the first and second chambers so as to keep the pressure-adjusting hole opened. The first chamber is formed with an open portion 4a for supplying vacuum pressure to a desired system. To the open portion 4a is connected a low-vacuum pipe 15a forming a desired system 15, into which is supplied the required vacuum pressure resulting from the reduction of vacuum pressure from a vacuum-supply source. An air-passage opening 4a is so opened in the upper wall surface of the first chamber as to make a detour along the second chamber 5 until it comes to communicate with the inside of the third chamber 13.

The second chamber 5 is connected to a pipe 11 for communicating the fourth chamber 12 and the high-vacuum pipe 1a by means of a connection pipe 11a via a small hole 5a formed in the second chamber 5. Also, the ceiling of the second chamber 5 bordering the third chamber 13 is formed with an air-induction hole 6a in communication with the third chamber 13. A pilot valve 6 capable of closing the air-induction hole 6a from the side of the second chamber 5 is so provided as to face the air-induction hole 6a.

The base 6b of the pilot valve 6 is secured to the central part of the diaphragm 7 partitioning the third and fourth chambers 13 and 12. The third chamber 13 is formed with an open portion 14 in communication with the air-passage opening 4b of the first chamber through an air-filter 14a and a detour pipe 20. The fourth chamber 12 is formed with an opening 10 in the lateral wall and the opening 10 is disposed in communication with the inside of the high-vacuum pipe 1a through the pipe 11. A spring-adjusting screw 9 is air-tightly threaded into the ceiling of the fourth chamber 12, and a compression spring 8 is interposed between a spring support portion 9a for the screw 9 and the center of upper surface of the diaphragm 7.

In the above-mentioned preferred embodiment, although the open portion 14 of the third chamber 13 is formed in communication with the first chamber 4 for flowing air from the latter to the former chamber, yet, it may be opened into atomspheric air through the air-filter 14a and the air-passage opening 4b and the detour passage 20 may be dispensed with whereby it is made possible to actuate the pilot valve 6 on the basis of atmospheric pressure to achieve the same object. However, in this case, since the difference in pressure between the third and fourth chambers is sure to become large, it is necessary to strengthen the resilient force of the compression spring 8. Also, in order to further stabilize the actuation of the valve body 2, its stem 2b may be guided in an up-and down movable manner by means of a guide cylinder 50 disposed with a small clearance from the stem 2b. At the same time, numeral 51 is an arm projected from the inner wall of the first chamber 4 so as to support the guide cyliner 50.

Figure 2:
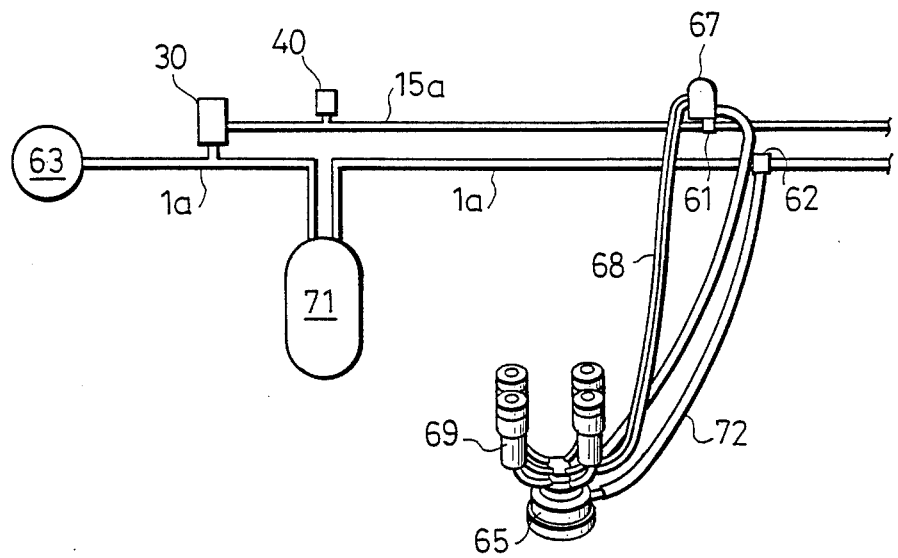
FIG. 2 is a view of one example of method for using the device of the preferred embodiment shown in FIG. 1.

In explaining the function of the present invention, reference is made to an example of milking system of vacuum-pipe arrangement (See Japanese Patent Publication No. 60-19972) as shown in FIG. 2.

As divergent from the high-vacuum pipe 1a directly connected to the vacuum pump 63 through the vacuum-pressure supply device 30, there is provided a low-vacuum pipe 15a in parallel with the high-vacuum pipe 1a for supplying vacuum pressure to a pulsator 67, the low-vacuum pipe 15a being arranged in a byre. Both high-and low vacuum pipes 1a and 15a are formed with vacuum-take openings 61, 62 . . . in a plurality of positions, to which is connected a milking unit. To the low-vacuum pipe 15a is connected a vacuum adjuster 40 (See FIG. 3) which is so actuated as to regulate the amount of inflow of air into the low-vacuum pipe 15a according to changes in the amount of vacuum consumption in the milking unit, in order that low-vacuum pressure supplied from the high-vacuum pipe 1a, after reduced through the vacuum-pressure supply device 30, may be kept at the required level (for example, 350 mm Hg).

In this case, the milking unit consists of a pulsator 67 for feeding vacuum pressure from the low-vacuum pipe to a pulsating chamber, alternately with atmospheric air, in teat cups 69 through a connection pipe 68, a milk claw 65 connection to a vacuum-take opening 62 through a connection pipe 72 for supplying vacuum pressure supplied from the high-vacuum pipe 1a after pressure reduction, to cows' teats in the teat cups 69 and then collecting milk in the teat cups and conveying it into the high-vacuum pipe, and a releaser 71 in which milk collected in the high-vacuum pipe 1a can be stored.

In the milking unit, when the vacuum pump 63 is actuated, vacuum pressure in the high-vacuum pipe 1a is elevated and then enters the fourth chamber through the connection pipe 11 until the diaphragm 7 is raised against the force of the spring. Accordingly, the pilot valve 6 comes to close the air-induction hole 6a whereby vacuum pressure from the small hole 5a counteracts atmospheric air from the air-induction hole 6a until vacuum pressure in the second chamber is elevated to raise the valve body 2. As the result, vacuum pressure in the low-vacuum pipe 15a is elevated to a desired value. When such a desired value is reached, the vacuum-pressure adjuster 40 is actuated to keep the required vacuum pressure in the low-vacuum pipe 15a. Said required vacuum pressure as vacuum pressure in the first chamber 4 will act on the diaphragm 3 and then affect the third chamber 13 via the detour passage 20 until it also acts on the diaphragm 7. As the result, the pilot valve 6 is lowered and then the degree of vacuum in the second chamber 5 is also lowered until the diaphragm 3 is lowered and the valve body 2 is stopped still in such a position as the high-vacuum pipe 1a and the low-vacuum pipe 15a assume the required vacuum-pressure as a balance.

Namely, in the above-mentioned milking unit, vacuum-pressure in the low-vacuum pipe 15a is kept at a constant level by means of the vacuum-pressure adjuster 40 so that vacuum-pressure in the high-vacuum pipe 1a can be determined by the amount of inflow of air through the clearance between the valve body 2 and the pressure-adjusting hole 2a.

The adjustment of open degree of the pressure-adjusting hole can be ensured by controlling the spring-adjusting screw 9. When vacuum in the high-vacuum pipe is consumed during operation of the milking unit, pressure changes are likely to occur in the low-vacuum pipe.

However, it is possible to control such pressure change due to the fact that the vacuum-pressure adjuster 40 is actuated to smooth individual pulses of vacuum pressure consequential to operation of the milking unit so as to keep vacuum pressure almost at a constant level.

On the other hand, when vacuum pressure in the high-vacuum pipe becomes higher than the required one, it is adapted to return to normal due to such conditions in series as the elevation of vacuum pressure in the fourth chamber 12→ raise of the pilot valve 6→ decrease in amount of air flowing into the second chamber 5 from the first chamber 4→ elevation of vacuum pressure in the second chamber 5→ raise of the valve body 2→ increase in amount of air flowing into the high-vacuum pipe.

Conversely, when vacuum pressure becomes lower, it can return to normal due to such conditions in series as lowering of vacuum pressure in the fourth chamber 12→ lowering of the pilot valve 6→ lowering of vacuum pressure in the second chamber 5→ lowering of valve body 2.

In this way, it is possible to reduce vacuum pressure from the vacuum supply source and to supply the reduced vacuum pressure to the low-vacuum pipe and at the same time, to keep vacuum pressure in the vacuum supply source at a constant level.

When a conventional vacuum-pressure adjuster is disposed in communication with a desired system, it can do nothing more than the function of adjusting the desired system at a merely uniform level throughout. Therefore, such a conventional system has heretofore not been used in such a case as it is connected to one high-vacuum system for the purpose of producing a low-vacuum pressure system so that the pressure has to be decreased by the required degree on the basis of standard of the high-vacuum system while leaving the high-vacuum system without further treatment.

In contrast, the present invention has the function of achieving such a purpose, all in all.

As explained hereinbefore, as divergent from a vacuum line directly connected to a vacuum pump, a branch pipe can be provided and by attaching the vacuum-pressure supply device of the present invention to said branch pipe, it is possible to produce a high-and low vacuum line suitable for milking systems, and moreover, by the use of a conventional vacuum-pressure adjuster in combination with the present invention. It is possible to ensure the concurrent function of adjusting vacuum pressure of the high-vacuum line at a constant level, to which no vacuum-pressure adjuster is attached.

What is claimed is:

1. A vacuum pressure supply device for a dual pressure cow milking arrangement, comprising:

casing members defining a first hollow space and a second hollow space separated from said first hollow space by a wall member;

a first diaphragm cooperating with said casing members to define a first chamber and a second chamber in said first hollow space;

a second diaphragm cooperating with said casing members to define a third chamber and a fourth chamber in said second hollow space;

a high vacuum pressure pipe having a vacuum pump connected at one end to provide a pressure below atmospheric pressure and a milking arrangement in communication with a low vacuum pressure pipe pressure in said low vacuum pressure pipe being below atmospheric pressure and above said pressure in said high vacuum pressure pipe;

a pressure adjusting hole formed in said casing communicating with said high vacuum pressure pipe;

a first chamber valve body having one end secured to said first diaphragm and a second end positionable in said pressure adjusting hole to restrict said pressure adjusting hole an amount dependent upon the displacement of said first diaphragm;

a high vacuum pressure line connected to said high vacuum pressure pipe and connected to said second chamber and said fourth chamber;

an air-induction hole formed in said wall member providing communication between said second chamber and said third chamber;

a pilot valve connected to said second diaphragm and positioned in said air induction hole for adjusting an amount of air flowing through said air induction hole from said third chamber into said second chamber in dependence upon the displacement of said second diaphragm;

said third chamber being formed with an open portion for communication with one of atmospheric air and said first chamber; and resilient means for supporting said second diaphragm by resilient force.

2. A vacuum arrangement for a cow milking unit, comprising:

a high vacuum pipe line connected to a vacuum pump at one end; a low vacuum pressure pipe line; vacuum pressure supply means maintaining a vacuum pressure difference between said high vacuum pipe line and said low vacuum pipe line, said vacuum pressure supply means connecting said low vacuum pressure pipe line to said high vacuum pressure pipe line, each of said high vacuum and low vacuum pressure pipe lines being formed with openings for connection with a cow-milking unit; a vacuum pressure adjuster means, maintaining pressure in said low vacuum pressure pipe line substantially constant, connected to said low vacuum pressure pipe line for adjusting said low vacuum pressure pipe line pressure to a constant level; said vacuum pressure supply means including casing members defining a first hollow space and a second hollow space separated from said first hollow space by a wall member;

a first diaphragm cooperating with said casing members to define a first chamber and a second chamber in said first hollow space;

a second diaphragm cooperating with said casing members to define a third chamber and a fourth chamber in said second hollow space;

a pressure adjusting hole formed in said casing communicating with said high vacuum pressure pipe line;

a first chamber valve body having one end secured to said first diaphragm and a second end positionable in said pressure adjusting hole to restrict said pressure adjusting hole an amount dependent upon the displacement of said first diaphragm;

high vacuum pressure connection line connected to said high vacuum pressure pipe and connected to said second chamber and said fourth chamber;

an air-induction hole formed in said wall member providing communication between said second chamber and said third chamber;

a pilot valve connected to said second diaphragm and positioned in said air induction hole for adjusting an amount of air flowing through said air induction hole from said third chamber into said second chamber in dependence upon the displacement of said second diaphragm;

said third chamber being formed with an open portion for communication with one of atmospheric air and said first chamber; and resilient means for supporting said second diaphragm by resilient force.

* * * * *